US009794821B2

(12) United States Patent
Jeon et al.

(10) Patent No.: US 9,794,821 B2
(45) Date of Patent: Oct. 17, 2017

(54) CHANNEL RESERVATION FOR OPERATION IN AN UNLICENSED SPECTRUM

(71) Applicant: Intel IP Corporation, Santa Clara, CA (US)

(72) Inventors: Jeongho Jeon, San Jose, CA (US); Huaning Niu, Milpitas, CA (US); Qinghua Li, San Ramon, CA (US); Hwan-Joon Kwon, Santa Clara, CA (US); Christian Ibars-Casas, San Jose, CA (US); Pingping Zong, Randolph, NJ (US); Mo-Han Fong, Sunnyvale, CA (US); Apostolos Papathanassiou, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 130 days.

(21) Appl. No.: 14/543,670

(22) Filed: Nov. 17, 2014

(65) Prior Publication Data
US 2015/0312793 A1 Oct. 29, 2015

Related U.S. Application Data

(60) Provisional application No. 61/985,346, filed on Apr. 28, 2014.

(51) Int. Cl.
H04W 28/02 (2009.01)
H04W 74/08 (2009.01)
(Continued)

(52) U.S. Cl.
CPC ... *H04W 28/0205* (2013.01); *H04W 74/0816* (2013.01); *H04W 28/26* (2013.01);
(Continued)

(58) Field of Classification Search
CPC .......................... H04W 72/04–72/042; H04W 72/121–72/1215; H04W 72/1273; H04W 74/006; H04W 74/08–74/0858
See application file for complete search history.

(56) References Cited

U.S. PATENT DOCUMENTS

2008/0107095 A1 5/2008 Black et al.
2012/0307748 A1 12/2012 Cheng et al.
(Continued)

OTHER PUBLICATIONS

International Search Report and Written Opinion mailed Jun. 18, 2015 from International Application No. PCT/US2015/019994.

*Primary Examiner* — Eric Myers
(74) *Attorney, Agent, or Firm* — Schwabe, Williamson & Wyatt, P.C.

(57) ABSTRACT

Embodiments described herein relate generally to a communication between a user equipment ("UE") and an evolved Node Bs ("eNBs") in a plurality of frequency bands. An eNB may transmit cross-carrier, cross-subframe scheduling information to a UE in a licensed frequency band. In response reception of the scheduling information, the UE may sense a wireless transmission medium to determine if the medium is idle. If the medium is idle, the UE may generate and transmit a request to reserve the medium in the unlicensed frequency band (e.g., a Clear-to-Send message). The eNB may transmit downlink data to the UE in the unlicensed frequency band. Other embodiments may be described and/or claimed.

23 Claims, 10 Drawing Sheets

(51) Int. Cl.
*H04W 28/26* (2009.01)
*H04W 72/04* (2009.01)
*H04W 72/12* (2009.01)
*H04W 74/00* (2009.01)

(52) U.S. Cl.
CPC ........ *H04W 72/042* (2013.01); *H04W 72/121* (2013.01); *H04W 74/006* (2013.01)

(56) References Cited

U.S. PATENT DOCUMENTS

| | | | |
|---|---|---|---|
| 2013/0188571 A1 | 7/2013 | Cheong et al. | |
| 2014/0029561 A1 | 1/2014 | Kim et al. | |
| 2014/0112289 A1 | 4/2014 | Kim et al. | |
| 2014/0287769 A1* | 9/2014 | Taori | H04W 74/0808 455/450 |
| 2015/0146645 A1 | 5/2015 | Sergeyev et al. | |
| 2015/0215100 A1 | 7/2015 | Jeon et al. | |
| 2016/0066349 A1* | 3/2016 | Seok | H04W 24/02 370/338 |
| 2016/0381646 A1* | 12/2016 | Li | H04W 74/0816 370/338 |
| 2016/0381680 A1* | 12/2016 | Yasukawa | H04W 72/1289 370/280 |

* cited by examiner

CHANNEL RESERVATION FOR OPERATION IN AN UNLICENSED SPECTRUM

CROSS REFERENCE TO RELATED APPLICATIONS

This application claims priority under 35 U.S.C. §119(e) to U.S. Provisional Patent Application No. 61/985,346, entitled "An Improved Local Channel Reservation for LTE Operation in the Unlicensed Spectrum" and filed Apr. 28, 2014. The disclosure of this provisional application is incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

In communicating in a radio access network, a mobile terminal and a base station may communicate in a frequency band. Radio frequency bands may be regulated, for example, by the government. A frequency band may be licensed so that communication may occur in that band. Pursuant to the licensing of a frequency band, a mobile terminal and a base station may be configured to communicate in that frequency band. Due to increasing demand for high data rates over wireless networks, the unlicensed spectrum is being examined for the potential to increase data throughput.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
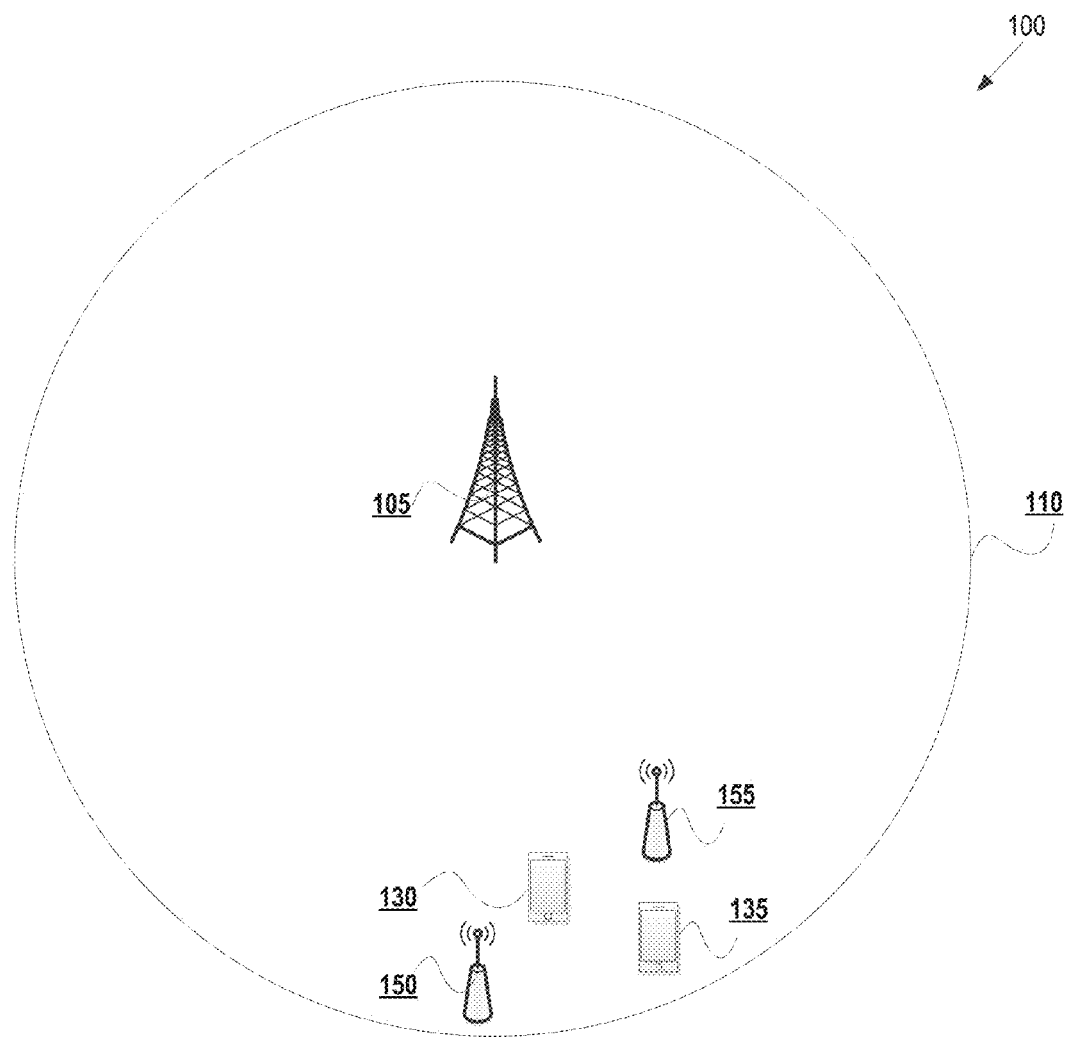
FIG. 1 is a block diagram illustrating an environment in which one or more user equipment may be adapted to reserve a medium for reception of downlink transmissions, in accordance with various embodiments

Beginning first with FIG. 1, a block diagram shows an environment 100 in which one or more user equipment ("UE") 130-135 may be adapted to reserve a medium for reception of downlink transmissions, in accordance with various embodiments. The UEs 130-135 may be any type of computing device equipped with broadband circuitry and adapted to operate on a cell (e.g., the cell 110) according to, for example, one or more 3$^{rd}$ Generation Partnership Project ("3GPP") technical specifications. For example, one or both of the UEs 130-135 may be a netbook, a tablet computer, a handheld computing device, a web-enabled appliance, a gaming device, a mobile phone, a smartphone, an eBook reader, a personal data assistant, or the like. In another embodiment, one or both of the UEs 130-135 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

According to embodiments, the UEs 130-135 may be configured for intersystem communication by operating on a wireless cell 110. The wireless cell 110 may be provided by an evolved node B ("eNB") 105. The eNB 105 may connect the UEs 130-135 to a core network as part of, for example, a third Generation ("3G"), fourth Generation ("4G"), fifth Generation ("5G"), or beyond system that adheres to one or more standards, such as Long Term Evolution ("LTE"), LTE-Advanced ("LTE-A"), or other similar standard. In various embodiments, the one or more standards may be promulgated by 3GPP.

In embodiments, the UEs 130-135 may communicate with the eNB 105 in a plurality of frequency band while operating on the cell 110. For example, the eNB 105 may transmit downlink data to the UEs 130-135 in a first frequency band. This first frequency band may be a licensed frequency band for wireless cellular communication between the eNB 105 and the UEs 130-135, for example, a licensed LTE frequency band.

Additionally, the eNB 105 may be adapted to transmit downlink data to the UEs 130-135 in a second frequency band. This second frequency band may be an unlicensed frequency band. In the unlicensed frequency band, the eNB 105 and the UEs 130-135 may communicate according to a standard associated with LTE, such as LTE Licensed Assisted Access ("LTE-LAA"). In some embodiments, communication in the unlicensed frequency band may supplement primary downlink transmissions in the licensed frequency band and/or provide additional component carriers for carrier aggregation.

Given the lack of exclusive control over the unlicensed frequency band, any communication between the eNB 105 and the UEs 130-135 in the unlicensed band may be affected by the coexistence of other radio technologies using the same unlicensed frequency band. For example, incumbent systems in the five (5) gigahertz ("GHz") Unlicensed National Information Infrastructure ("U-NII") may be wireless local area network ("WLAN") systems, especially those using the Institute of Electrical and Electronics Engineers ("IEEE") 802.11 a/n/ac technologies. Since WLAN systems are widely deployed, for example by individuals for personal use and/or operators for carrier-class connectivity solutions and mobile data offloading, communication between the eNB 105 and the UEs 130-135 should consider potential interference before initiating an LTE operation in the unlicensed frequency band.

As illustrated in the environment 100, one or more WLAN transmitters 150-155 may be deployed in proximity to the UEs 130-135. The WLAN transmitters 150-155 may be any WLAN node adapted to transmit data over a WLAN in the same unlicensed frequency band that the eNB 105 and the UEs 130-135 may use for communication (e.g., LTE-LAA communication). For example, one of the WLAN transmitters 150-155 may be a WLAN access point, a personal WLAN device, or even another UE.

Under carrier sense multiple access with collision avoidance ("CSMA/CA") used in WLAN systems, a node (e.g., one of the WLAN transmitters 150-155) having data to transmit first performs a clear channel assessment ("CCA") by sensing the medium associated with the unlicensed frequency band for a certain duration of time. If the medium associated with the unlicensed frequency band is idle, then the node may assume that it may take ownership of the medium. In doing this, a request-to-send ("RTS")/clear-to-send ("CTS") exchange mechanism may be used to mitigate potential collision and interference. This RTS/CTS may be required by an IEEE 802.11 specification for WLAN nodes, including the WLAN transmitters 150-155. While the use of RTS/CTS is not mandatory, a WLAN node that receives a CTS message generally must honor that CTS message—e.g., even if an RTS/CTS mechanism is not enabled in a WLAN basic service set ("BSS"), a WLAN station ("STA") that is associated with the BSS should defer its transmission if that STA overhears a CTS message from another BSS. Consequently, the WLAN transmitters 150-155 may be required to comply with CTS messages that are received and, accordingly, refrain from accessing the medium associated with the unlicensed frequency band for a duration of time specified in such CTS messages.

In embodiments, the RTS/CTS exchange mechanism may be employed to facilitate communication in the unlicensed frequency band between the eNB 105 and the UEs 130-135. In embodiments, eNB 105 may be adapted to schedule downlink transmissions for the UEs 130-135 in the unlicensed frequency band. The eNB 105 may be adapted to schedule downlink transmissions for one or more of the UEs 130-135 that are to occur in different subframes (i.e., "cross-subframe) and/or are to occur on different component carriers (i.e., "cross-carrier"). This scheduling information may be transmitted to the UEs 130-135 by the eNB 105 in the licensed frequency band.

Based on the scheduling information, the UEs 130-135 may be informed of a time and/or a duration that the medium in the unlicensed frequency band is to be reserved for downlink transmission in the unlicensed frequency band. In response, the UEs 130-135 may sense the medium associated with the unlicensed frequency band (e.g., by performing CCA). If the medium is not in use, the UEs 130-135 may generate respective CTS messages that are to reserve the medium, for example, for a duration indicated in the scheduling information. The UEs 130-135 may then transmit the respective CTS messages to one or more of the WLAN transmitters 150-155. In one embodiment, the UEs 130-135 may broadcast the respective CTS messages. In embodiments, the UEs 130-135 may transmit the respective CTS messages to one or more of the WLAN transmitters 150-155, but those CTS messages may not be specifically addressed to the one or more WLAN transmitters 150-155; that is, the UEs 130-135 may transmit the respective CTS messages and the one or more WLAN transmitters 150-155 may detect or "overhear" the CTS messages without those CTS messages being specifically destined for the one or more WLAN transmitters 150-155.

Thereafter, the eNB 105 may transmit downlink data to the UEs 130-135 in the medium associated with the unlicensed frequency band. In some embodiments, reservation of the medium by the UEs 130-135 is implicitly acknowledged, e.g., the eNB 105 assumes that the UEs 130-135 sensed the medium was idle and broadcasted respective CTS messages to reserve the medium for communication of downlink data by the eNB 105.

In other embodiments, the UEs 130-135 may be adapted to transmit, to the eNB 105, respective acknowledgement messages after respective transmissions of respective CTS messages. The acknowledgement messages may indicate to the eNB 105 that the medium is clear for downlink transmissions to the UEs 130-135. Accordingly, the eNB 105 may begin respective downlink transmissions to the UEs 130-135 in response to reception of the respective acknowledgement messages.

In some embodiments, reservation of the medium by the UEs 130-135 is explicitly acknowledged, e.g., the UEs 130-135 may transmit respective acknowledgement messages after respective CTS message transmissions. In anticipation of medium reservation, the UEs 130-135 may generate respective acknowledgement messages before respective CTS message transmissions. Therefore, the UEs 130-135 may be adapted to transmit respective acknowledgement messages after respective CTS message transmissions without spending time generating the respective acknowledgement messages, which may consume the time during which the medium is reserved.

In some embodiments, reservation of the medium by the UEs 130-135 is semi-explicitly acknowledged, e.g., the UEs 130-135 may transmit respective acknowledgement messages before respective CTS message transmissions. In anticipation of medium reservation, the UEs 130-135 may generate respective acknowledgement messages before respective CTS message transmissions and transmit the respective acknowledgement messages before respective CTS message transmissions—e.g., the UEs 130-135 may generate and transmit respective acknowledgement messages in response to sensing that the medium is idle and, thereafter, transmit respective CTS messages. Accordingly, consumption of the time during which the medium is reserved by generation and transmission of acknowledgement messages may be reduced or eliminated.

In one embodiment, one of the UEs 130-135 may sense the medium by performing CCA and include in an acknowledgement message an indication of feedback based on the CCA performance. From CCA feedback indicated in an acknowledgement message, the eNB 105 may be able to determine if the medium is idle and likely to be reserved by the one of the UEs 130-135 transmitting the CTS message.

The cross-carrier, cross-subframe scheduling and implicit, explicit, and semi-explicit embodiments associated with acknowledgment of reservation of the medium may reduce a duration between reservation of the medium associated with the unlicensed frequency band and downlink data transmission in the medium.

Figure 2:
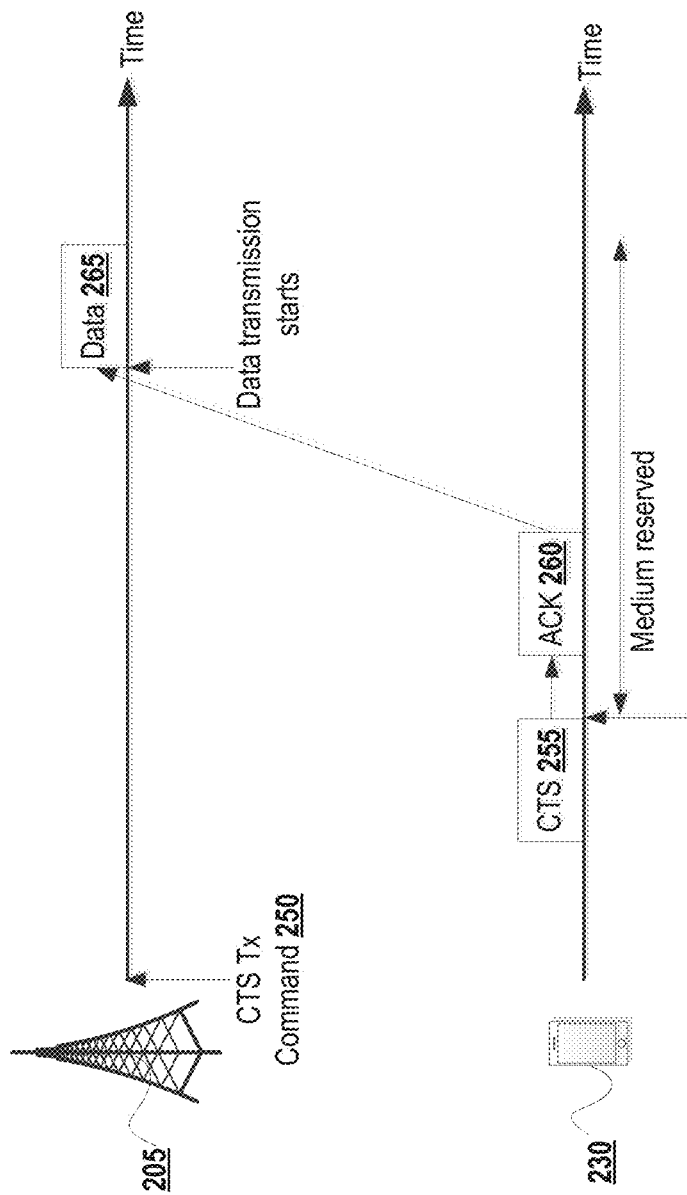
FIG. 2 is a block diagram illustrating systems and operations for attempted reservation of a medium associated with an unlicensed frequency band, in accordance with various embodiments.

With respect to FIG. 2, a block diagram illustrates systems and operations for attempted reservation of a medium associated with an unlicensed frequency band, in accordance with various embodiments. The eNB 205 may be an embodiment of the eNB 105 and the UE 230 may be an embodiment of one of the UEs 130-135, as illustrated in FIG. 1.

In various embodiments, an RTS message alone cannot reserve the medium associated with the unlicensed frequency band. Consequently, WLAN nodes (not shown) may disregard an RTS messages that is detected (e.g., "overheard") if that RTS message is not followed by a CTS message.

Transmission of a CTS message by the eNB 205, however, may be ineffective—e.g., the eNB 205 may be unable to sense the medium (e.g., perform CCA). For example, for WiFi transmissions in a building where the eNB 205 is located outside that building, a WiFi node may not receive a CTS message from the eNB 205 since that WiFi node may be engaged in transmission (e.g., because the eNB 205 was unable to sense that the medium was idle) and/or the WiFi node may be unable to decode the CTS message due to high propagation loss. Further, CTS messages are to clear potential interferers around the receiver (e.g., the UE 230) and, therefore, transmission of a CTS message by the eNB 205 would trigger a WLAN node (not shown) around the eNB 205 to set its network allocation vector ("NAV") for no reason, e.g., because the medium proximate to the UE 230 has not been effectively reserved. Therefore, transmission of the CTS message by the UE 230 may protect the intended data receiver (i.e., the UE 230) more effectively than transmission of the CTS message by the intended data transmitter (i.e., the eNB 205).

Adoption of the RTS/CTS exchange between the eNB 205 and the UE 230 may be limited for establishing a point-to-point link. This point-to-point link may not allow multiplexing of the physical resources for multiple UEs. Further, exchange of RTS/CTS messages in the unlicensed frequency band may be prone to failure. Accordingly, cross-carrier, cross-subframe scheduling, upon which CTS message transmission by the UE 230 may be based, may be more effective than RTS message transmission by the eNB 205 in the unlicensed frequency band.

In embodiments, the eNB 205 may transmit a command 250 for CTS message transmission to the UE 230. The command may be included in one or more subframes transmitted in a licensed frequency band. Based on the command 250, the UE 230 may generate and transmit the CTS message 255 to reserve the medium associated with the unlicensed frequency band for a duration indicated in the command 250. After reserving the medium, the UE 230 may generate the acknowledgment message 260 and transmit the acknowledgement message 260 to the eNB 205. However, the duration for which the medium is reserved may elapse by the time the UE 230 generates the acknowledgement message 260 and the time consumed by inherit latency in transmission of the acknowledgement message 260 to the eNB 205. Consequently, the medium may no longer be reserved at the point at which the eNB 205 begins transmission of data 265 to the UE 230, and therefore transmission of the data 265 may suffer from interference and collision in reaching the UE 230.

Figure 3:
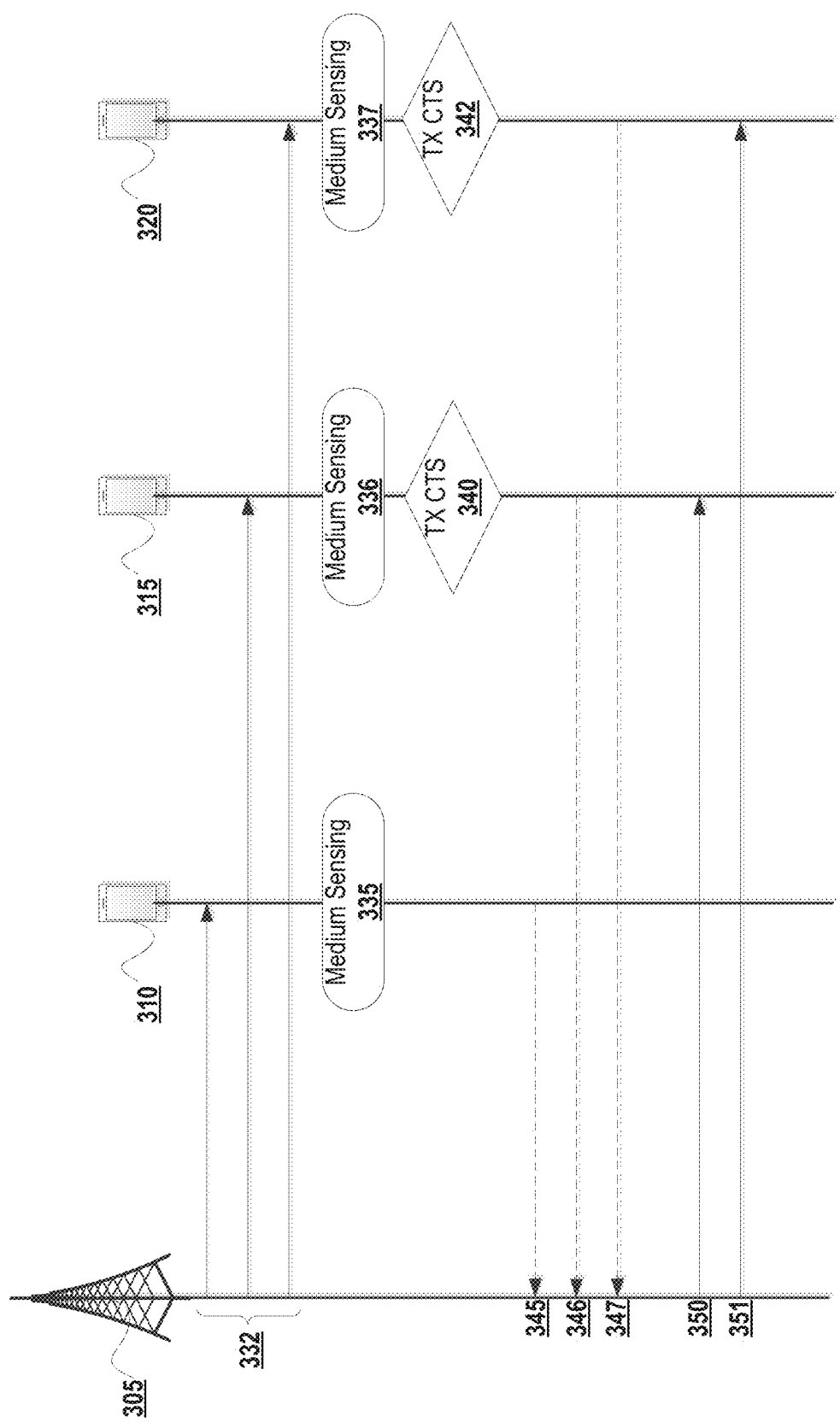
FIG. 3 is a sequence diagram illustrating systems and operations for reservation of a medium associated with an unlicensed frequency band based on cross-carrier, cross-subframe scheduling, in accordance with various embodiments.

With respect to FIG. 3, a sequence diagram illustrates systems and operations for reservation of a medium associated with an unlicensed frequency band based on cross-carrier, cross-subframe scheduling, in accordance with various embodiments. The eNB 305 may be an embodiment of the eNB 105 and the UEs 310-320 may be embodiments of the UEs 130-135, as illustrated in FIG. 1.

According to embodiments, the eNB 305 may schedule downlink transmission over an unlicensed frequency band through cross-carrier, cross-subframe scheduling. At operation 332, the eNB 305 may transmit information associated with transmission of a CTS messages by the UEs 310-320.

The eNB 305 may transmit this information a predetermined number of subframes in advance of scheduled downlink data. This information may comprise cross-carrier, cross-subframe scheduling information, which may be scheduling and/or control information. For example, the eNB may include in this scheduling and/or control information one or more identifiers ("IDs") of the scheduled UEs 310-320, modulation and coding schemes ("MCSs"), resource allocation (e.g., physical resource block ("PRB") assignment), and/or other similar information associated with communication of data between the eNB 305 the UEs 310-320.

In embodiments, the eNB 305 may determine a duration that the eNB 305 may require to transmit downlink data to one or more of the UEs 310-320. The eNB 305 may include this duration in the scheduling and/or control information to indicate to the one or more UEs 310-320 a duration for which the one or more UEs 310-320 should reserve the medium associated with the unlicensed frequency band.

The eNB 305 may determine a time at which one or more UEs 310-320 are to transmit respective CTS messages to reserve the medium. The eNB 305 may include this time in the scheduling and/or control information. For example, CTS message transmission by the UEs 310-320 may be synchronous and, therefore, the eNB 305 may indicate in the scheduling and/or control information a value corresponding to a time at which all the UEs 310-320 are to transmit respective CTS messages to reserve the medium.

In one embodiment, the eNB 305 may apply semi-persistent scheduling with the scheduling and/or control information. For example, the eNB 305 may apply semi-persistent scheduling where the eNB 305 is to transmit a relatively large amount of data to one or more of the UEs 310-320.

In embodiments, the eNB 305 may transmit this scheduling and/or control information in a licensed frequency band. In one embodiment, the eNB 305 may be broadcast this information to the UEs 310-320. In some embodiments wherein the eNB 305 is to broadcast this information, the eNB 305 may include respective IDs of each UE 310-320, such as by hiding respective IDs of each UE 310-320 in scrambling mask implicitly.

In another embodiment, the eNB 305 may unicast this scheduling and/or control information to each UE 310-320. In some embodiments wherein the eNB 305 is to unicast this information, the eNB 305 may beamform the scheduling and/or control information such that an ID of each UE 310-320 may not be explicitly signaled in a payload of a unicast transmission to each UE 310-320.

In one embodiment, the eNB 305 may transmit this scheduling and/or control information using a Physical Downlink Control Channel ("PDCCH"). Alternatively, the eNB 305 may transmit this scheduling and/or control information using an Enhanced PDCCH ("EPDCCH") and/or piggybacking on another signal or through another channel.

Each of the UEs 310-320 may decode a respective PDCCH and identify that there will be downlink data from the eNB 305—e.g., each of the UEs 310-320 may identify that the eNB 305 is to transmit data using a physical downlink shared channel ("PDSCH") in the unlicensed frequency band for a duration specified by the PDCCH (or by a predetermined rule and/or preconfigured data). As illustrated in operations 335-337, each of the UEs 310-320 may sense the medium associated with the unlicensed frequency band based on operation 332—e.g., at operation 335, the first UE 310 may perform CCA and determine that the medium is busy, whereas UEs 315-320 may perform CCA and determine that the medium is idle. At operations 340-342, each of the UEs 315-320 that sense that the medium is idle may transmit respective CTS messages to reserve the medium.

In various embodiments, the UEs 315-320 may be proximate to one another so that the UEs 315-320 can detect CTS messages of one another. Each of the UEs 315-320 may be adapted to determine that a detected CTS message is transmitted by the other one of the UEs 315-320 so that each of the UEs 315-320 does not honor the NAV set by the other one of the UEs 315-320 but continues to transmit its own CTS message. Accordingly, respective CTS messages transmitted at operations 340-342 may include a special address, which may be configured by the eNB 305 (e.g., in the scheduling and/or control information), to facilitate identification by the UEs 310-320 of CTS messages from one another.

Where the eNB 305 has specified a time at which the UEs 310-320 are to synchronously transmit respective CTS messages, the UEs 315-320 that sense the medium is idle transmit respective CTS messages at the specified time. In some embodiments, CTS messages to be synchronously transmitted by the UEs 315-320 are to be identical—e.g., respective values of respective receiver address fields included in each CTS message must be the same, and respective values of respective duration fields included in each CTS message must be the same.

For synchronous transmissions that may occur simultaneously, the respective modulation schemes and respective coding rates to be used by each of the UEs 315-320 may be the same so that signals carrying the CTS messages may be superimposed over the air. The signal format for transmission may be preconfigured by a 3GPP specification, stored in each of the UEs 310-320 and/or indicated by the eNB 305 to the UEs 310-320. Synchronous CTS message transmissions that occur simultaneously may reduce the amount of time that would be needed to sequentially transmit the CTS messages from all the scheduled UEs 310-320 and/or may increase visibility to one or more WLAN nodes by amplifying a CTS message (e.g., because a plurality of UEs 315-320 are synchronously transmitting the identical CTS message).

If the UEs 315-320 that sense the medium to be idle want to reserve different durations and/or times (e.g., to increase spatial reuse shared with WLAN), then operations 340 and 342 may be performed sequentially so that the second UE 315 transmits a CTS message and, thereafter, the third UE 320 transmits another CTS message.

In one embodiment, the eNB 305 may instruct the UEs 315-320 to simultaneously transmit respective CTS messages even if those CTS messages are not identical. In such embodiments, the UEs 315-320 may not be proximate to one another and the eNB 305 may have location information about the UEs 315-320.

The eNB 305 may a priori schedule the sequential CTS message transmission. However, some legacy WLAN nodes may only honor a longest duration among all received CTS messages when setting their own NAVs.

In embodiments in which semi-persistent scheduling is used, the UEs 315-320 may reserve the medium ahead of time by autonomously sending respective CTS messages based on repeated scheduling intervals.

At operations 345-347, the UEs 310-320 transmit, to the eNB 305, respective indications of that success of the medium reservation. The respective indications of operations 345-347 may be transmitted in the licensed frequency band. In one embodiment, the first UE 310 that senses the medium to be busy transmits, to the eNB 305, a message that is to indicate the first UE 310 failed to reserve the medium. Based on this message from the first UE, the eNB 305 may refrain from transmitting data to the first UE 310 in the unlicensed frequency band. At operations 346-347, the UEs 315-320 that sensed the medium to be idle may transmit, to the eNB 305, respective acknowledgement messages that indicate those UEs 315-320 are to reserve the medium.

In some embodiments, the UEs 315-320 may generate the acknowledgement messages before generation and/or transmission of the CTS messages—e.g., the UEs 315-320 may generate respective acknowledgement messages and buffer those acknowledgement messages so that the UEs 315-320 may transmit those messages immediately after transmission of respective CTS messages. In one embodiment, operations 346-347 may occur before operations 340-342. That is, the UEs 315-320 that successfully sense that the medium is idle may transmit respective acknowledgement message before transmission of respective CTS messages.

In one embodiment, respective messages may include information that is based on the medium sensing operations 335-337. For example, one of the UEs 310-320 may include, in a message to the eNB 305, feedback and/or results associated with CCA performance. The eNB 305 may determine, from the information that is based on sensing of the medium, if one or more of the UEs 310-320 is or is likely to successfully reserve the medium.

At operations 350-351, the eNB 305 may transmit downlink data to the UEs 315-320 in the unlicensed frequency band based on the acknowledgement messages from the UEs 315-320. The eNB 305 may transmit the downlink data as scheduled by the cross-carrier, cross-subframe scheduling information transmitted at operation 332.

In one embodiment, the eNB 305 may send downlink data to all of the UEs 310-320 as long as one of the UEs 310-320 successfully transmits the CTS message. The eNB 305 may still transmit downlink data even if the first UE 310 is unable to transmit a CTS message because the first UE 310 sensed the medium to be busy but with conservative modulation and coding. Although interference from a WLAN node may be mitigated when more CTS messages are successfully transmitted, the first UE 310 may still rely on automatic repeat request ("ARQ") and/or hybrid ARQ ("HARQ") to overcome the noisy medium interfered with by the WLAN node.

In some embodiments, the eNB 305 may vacate resource blocks assigned to the first UE 310 that failed to reserve the medium. In such an embodiment, the transmission power of the resource blocks assigned to the other UEs 315-320 that successfully reserved the medium may be increased up to a predetermined peak power constraint. In various embodiments, the eNB 305 may overbook PDSCH resources during cross-carrier, cross-subframe scheduling—e.g., the eNB 305 may request all the UE 310-320 to transmit CTS messages even though the eNB 305 is incapable of contemporaneously serving all the UEs 310-320 in the unlicensed frequency band in anticipation of that at least one UE 310 will be unable to reserve the medium. The eNB 305 would still be able to serve the successful UEs 315-320 in the unlicensed frequency band based on received acknowledgment messages and/or received information associated with sensing the medium (e.g., CCA feedback). The eNB 305 may update resource allocation based on received acknowledgment messages and/or received information associated with sensing the medium (e.g., CCA feedback) and the eNB 305 may send updated scheduling and/or control information over the PDCCH at the beginning of downlink data transmission at operations 350-351.

One or more of operations 345-347 may be absent in some embodiments. For example, the first UE 310 detects that the medium is busy and, therefore, does not transmit a CTS message. Based on the absence of an acknowledgement message from the first UE 310, the eNB 305 may determine that the medium proximate to the first UE 310 is busy and refrain from transmitting downlink data to the first UE 310 in the unlicensed frequency band.

In some embodiments, an acknowledgement message associated with one of the operations 346-347 may be implicit. For example, the eNB 305 may assume that the second and third UEs 315-320 were able to transmit respective CTS messages to reserve the medium and, at operations 350-351, the eNB 305 transmits downlink data to those UEs 315-320 in the unlicensed frequency band.

In another embodiment, the eNB 305 may be sufficiently proximate to the UEs 315-320 to detect their respective CTS messages. In response to this detection, the eNB 305 may determine that the medium has been successfully reserved and transmit downlink data, as shown at operations 350-351, without transmission of acknowledgement messages by the UEs 315-320. In one embodiment, the UEs 315-320 may sequentially transmit their respective CTS messages so that the eNB 305 may detect which UEs 315-320 successfully reserved the medium and transmit the downlink data to those UEs 315-320.

Figure 4:
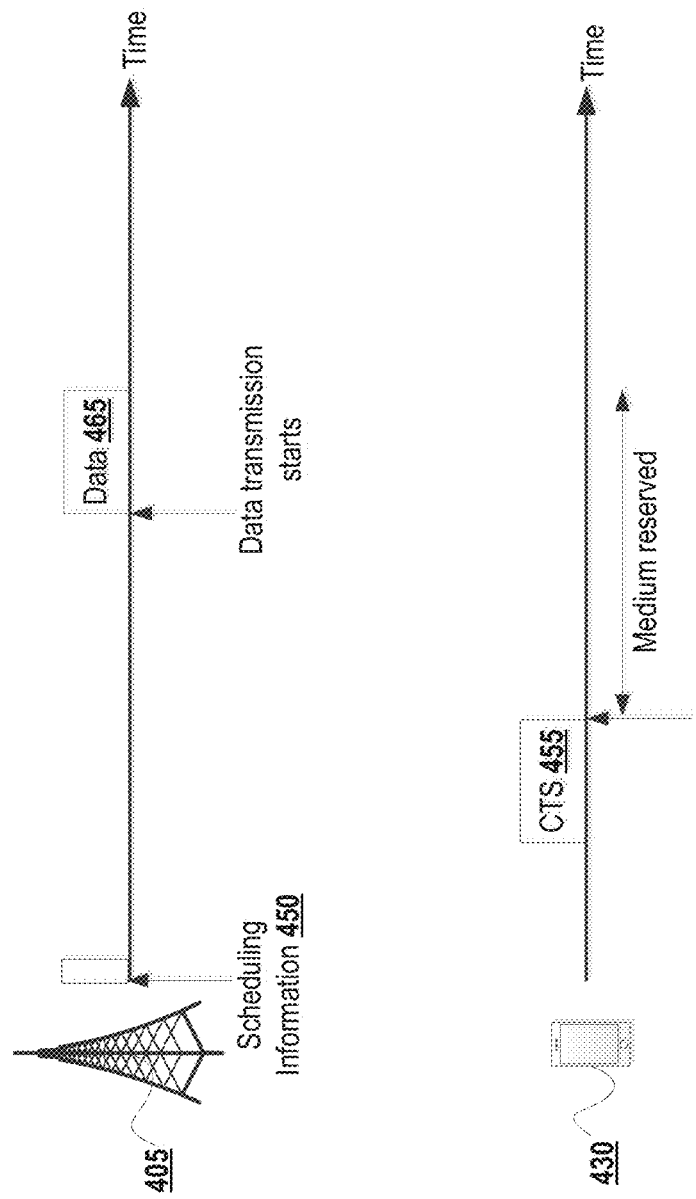
FIG. 4 is a block diagram illustrating systems and operations for implicit acknowledgment of reservation of a medium associated with an unlicensed frequency band, in accordance with various embodiments.

Now with reference to FIG. 4, a block diagram illustrates systems and operations for implicit acknowledgment of reservation of a medium associated with an unlicensed frequency band, in accordance with various embodiments. The eNB 405 may be an embodiment of the eNB 105 and the UE 430 may be an embodiment of one of the UEs 130-135, as illustrated in FIG. 1.

In various embodiments, the UE 430 may not transmit an acknowledgement message to the eNB 405 to indicate to the eNB 405 that the UE 430 sensed the medium to be idle (e.g., the UE 430 may not transmit CCA feedback to the eNB 405). In such embodiments, the eNB 405 may proceed with downlink data transmission in the unlicensed frequency band according to cross-carrier, cross-subframe scheduling information transmitted by the eNB 405.

In embodiments, the eNB 405 may transmit cross-carrier, cross-subframe scheduling information 450 to the UE 430 in a licensed frequency band. Based on the scheduling information 450, the UE 430 may sense the medium associated with the unlicensed frequency band (e.g., perform CCA) and, if the medium is sensed to be idle, generate and transmit the CTS message 455 to reserve the medium associated with the unlicensed frequency band.

Unless a time (e.g., an instance) for CTS message transmission is indicated in the scheduling information 450, the UE 430 may transmit the CTS message 455 at any time from which the scheduling information 450 is received (e.g., after decoding the PDCCH having the scheduling information) to when the actual transmission of data 465 begins. If the UE 430 transmits the CTS message 455 as soon as it senses the medium to be idle, the UE 430 may increase the likelihood that the UE 430 is able to reserve the medium; however, transmission of the CTS message 455 as soon as the UE 430 senses the medium to be idle may also increase the inefficiency of medium reservation. Conversely, if transmission of the CTS message 455 is delayed toward the beginning of the scheduled transmission of the data 465, the likelihood that the UE is able to reserve the medium may decrease, even though the reservation of the medium may be more efficient.

Because acknowledgment of medium reservation may be implicit, the eNB 405 may begin transmission of the data 465 in the unlicensed frequency band, e.g., at a scheduled instance, which may be signaled to the UE 430 in the scheduling information 450. Therefore, the eNB 405 may transmit data 465 to the UE 430 without an acknowledgement message indicating medium reservation and/or transmission of the CTS message 455 from the UE 430.

In some embodiments, the UE 430 may fail to reserve the medium and, consequently, may be unable to decode the data 465 due to interference and/or collision from one or more WLAN nodes (not shown) that are proximate to the UE 430.

Figure 5:
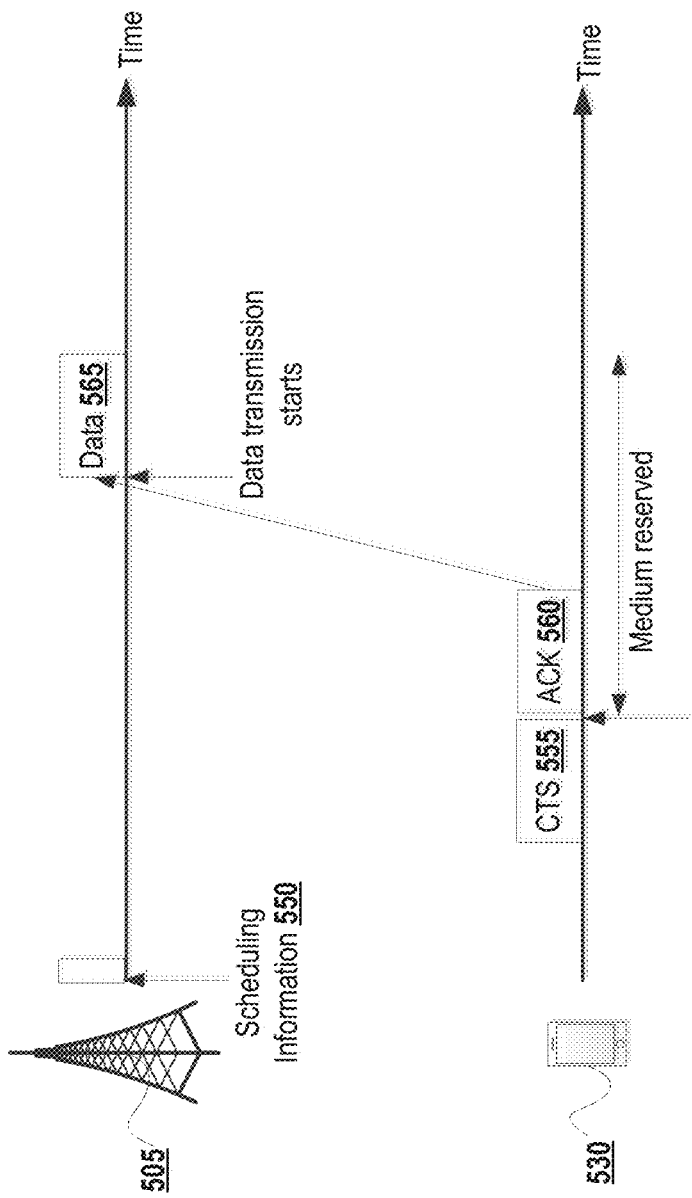
FIG. 5 is a block diagram illustrating systems and operations for explicit acknowledgment of reservation of a medium associated with an unlicensed frequency band, in accordance with various embodiments.

With respect to FIG. 5, a block diagram illustrates systems and operations for explicit acknowledgment of reservation of a medium associated with an unlicensed frequency band, in accordance with various embodiments. The eNB 505 may be an embodiment of the eNB 105 and the UE 530 may be an embodiment of one of the UEs 130-135, as illustrated in FIG. 1.

In embodiments, the eNB 505 may transmit cross-carrier, cross-subframe scheduling information 550 to the UE 530 in a licensed frequency band. Based on the scheduling information 550, the UE 530 may sense the medium associated with the unlicensed frequency band (e.g., perform CCA) and, if the medium is sensed to be idle, generate and transmit the CTS message 555 to reserve the medium associated with the unlicensed frequency band.

In various embodiments, the UE 530 may generate an acknowledgement message 560 to indicate that the medium is to be reserved (e.g., by transmission of the CTS message 555). Given that transmission of the CTS message 555 may only take a relatively small amount of time (e.g., a few tens of microseconds), the duration between the end of the transmission of the CTS message 555 and the beginning of the uplink acknowledgement message 560 may be minimized to minimize the duration between medium reservation by the UE 530 and actual transmission of the data 565. Therefore, the UE 530 may generate and/or buffer the acknowledgement message 560 before generation and/or transmission of the CTS message 555 so that the acknowledgement message 560 may be quickly transmitted after transmission of the CTS message 555.

Figure 6:
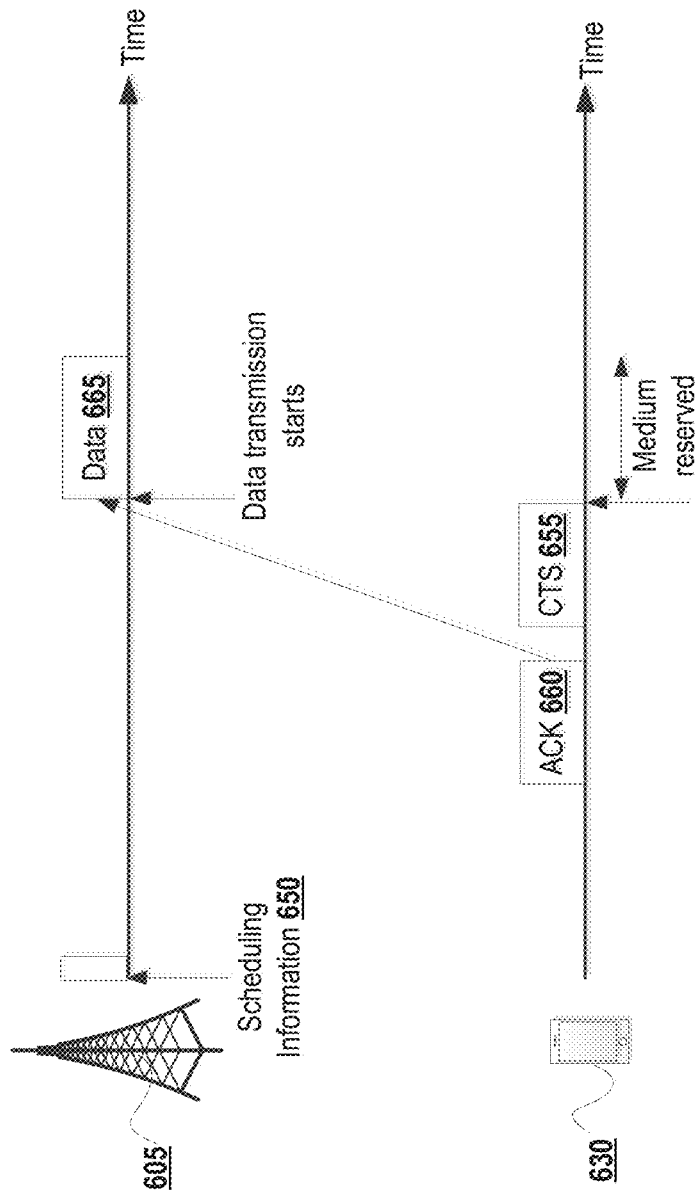
FIG. 6 is a block diagram illustrating systems and operations for semi-explicit acknowledgment of reservation of a medium associated with an unlicensed frequency band, in accordance with various embodiments.

Turning to FIG. 6, a block diagram illustrates systems and operations for semi-explicit acknowledgment of reservation of a medium associated with an unlicensed frequency band, in accordance with various embodiments. The eNB 605 may be an embodiment of the eNB 105 and the UE 630 may be an embodiment of one of the UEs 130-135, as illustrated in FIG. 1.

In embodiments, the eNB 605 may transmit cross-carrier, cross-subframe scheduling information 650 to the UE 630 in a licensed frequency band. Based on the scheduling information 650, the UE 630 may sense the medium associated with the unlicensed frequency band, such as by performing CCA. In various embodiments, the UE 630 may generate an acknowledgement message 660 that is to include information associated with the sensing of the medium. For example, the UE 630 may generate the acknowledgement message 660 to include an indication of whether the medium is sensed to be busy or idle and/or to include results or feedback from CCA performance.

The UE 630 may then transmit the acknowledgement message 660 to the eNB 605 in the licensed frequency band. Based on the information associated with the sensing of the medium in the acknowledgement message 660, the eNB 605 may determine if it is to transmit the data 665. If the acknowledgement message 660 indicates that the medium is idle, then the eNB 605 may assume that the UE 630 will transmit the CTS message 655 and, therefore, the eNB 605 will transmit the data 665 to the UE 630. However, if the acknowledgement message 660 indicates that the medium is busy, then the eNB 605 may assume that the UE 630 will not transmit the CTS message 655 and, therefore, the eNB 605 may refrain from transmitting the data 665 to the UE 630 in the unlicensed frequency band.

In some embodiments, the medium may be busy due to a WLAN transmission or proximate transmission associated with a cellular protocol in the unlicensed frequency band (e.g., an LTE-LAA transmission from another UE and/or eNB and/or relay node). When the UE 630 senses the medium is busy, the UE 630 may determine that it is able to distinguish such interfering transmissions. The UE 630 may include an indication this ability in the acknowledgement message 660 so that the eNB 605 may still transmit the data 665 to the UE 630, even though the medium is indicated to be busy.

Figure 7:
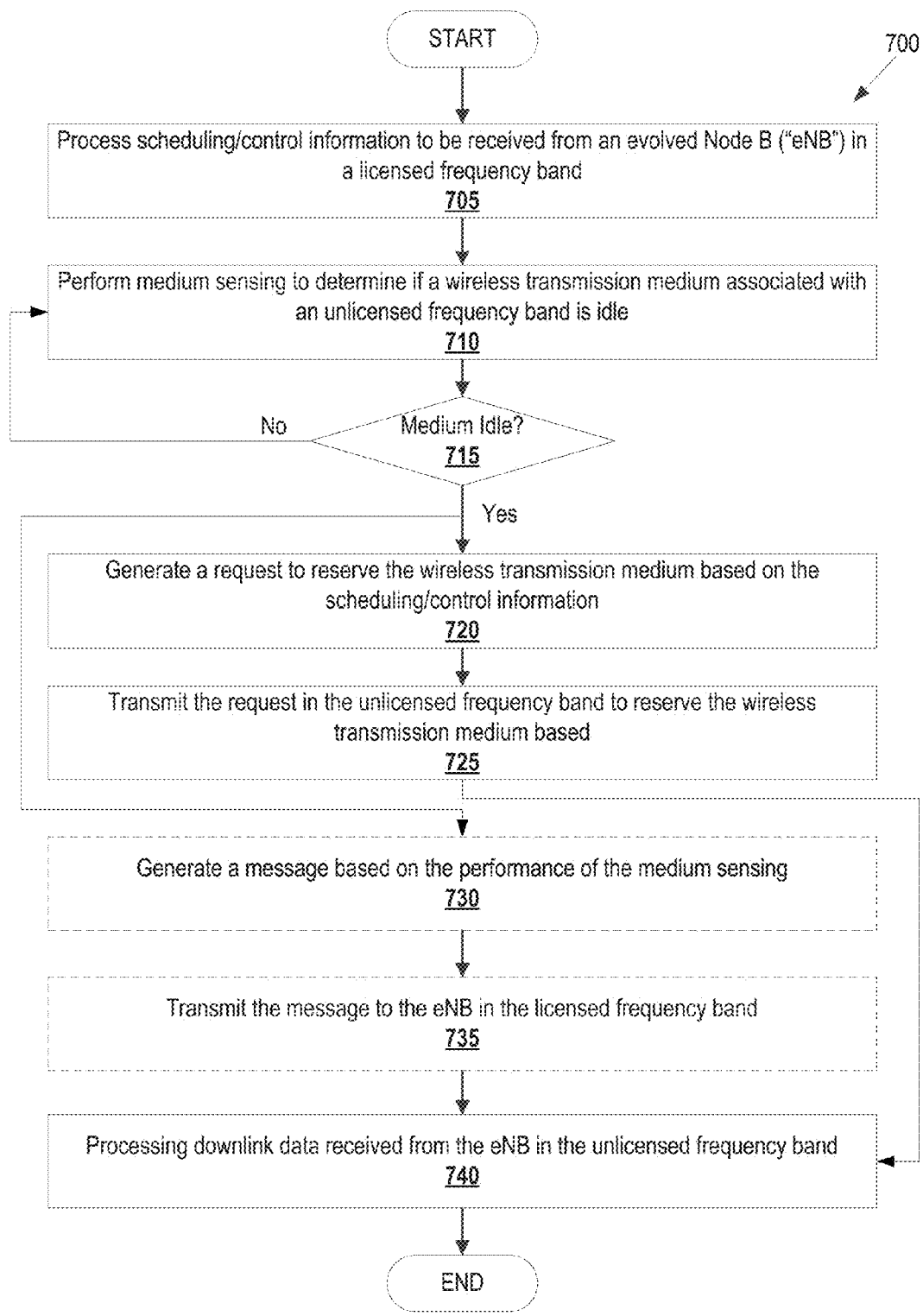
FIG. 7 is a flow diagram illustrating a method for reserving a medium associated with an unlicensed frequency band based on cross-carrier, cross-subframe scheduling information received in a licensed frequency band, in accordance with various embodiments.

With respect to FIG. 7, a flow diagram illustrates a method 700 for reserving a medium associated with an unlicensed frequency band based on cross-carrier, cross-subframe scheduling information received in a licensed frequency band, in accordance with various embodiments. The method 700 may be performed by a UE, such as the UE 130 of FIG. 1. While FIG. 7 illustrates a plurality of sequential operations, one of ordinary skill would understand that one or more operations of the method 700 may be transposed and/or performed contemporaneously.

To begin, the method 700 may include operation 705 for processing cross-carrier, cross-subframe scheduling information received in a licensed frequency band. This cross-carrier, cross-subframe scheduling information may indicate scheduling and/or control information for a downlink transmission that is to occur in an unlicensed frequency band.

At operation 710, the method 700 may include performing medium sensing to determine if a wireless transmission medium associated with an unlicensed frequency band is idle. In one embodiment, operation 710 may comprise performing CCA to determine feedback that is to indicate if the medium is idle.

If the medium sensing of operation 710 indicates that the medium is busy, then decision block 715 may cause operation 710 to be repeated—e.g., the medium may be sensed until the medium is idle. If the medium is sensed to be idle, decision block 715 may cause the method 700 to reach operation 720.

In embodiments, operation 720 may include generating a request to reserve the wireless transmission medium. In various embodiments, this request may be a CTS message. In various embodiments, operation 720 may include operations associated with generating the request based on the scheduling and/or control information processed at operation 705.

Operation 725 may include transmitting the generated request in the unlicensed frequency band to reserve the wireless transmission medium. In various embodiments, operation 725 may include operations associated with transmitting the request based on the scheduling and/or control information processed at operation 705.

In some embodiments, the method 700 may include operations 730-735. At operation 730, the method 700 may include generating a message based on the performance of the medium sensing. In various embodiments, operation 730 may include operations associated with generating a message that includes information associated with the performance of the medium sensing (e.g., CCA feedback). In another embodiment, operation 730 may include operations associated with generating a message that is to indicate that a request to reserve the medium has been or will be transmitted.

Operation 735 may comprise transmitting the generated message to the eNB in the licensed frequency band. In some embodiments, one or both of operations 730-735 may be performed before one or both of operations 720-725.

Operation 740 may comprise processing downlink data received from the eNB in the unlicensed frequency band across the reserved medium. In various embodiments, the downlink data may be associated with a cellular protocol, such as LTE. In various embodiments, processing of the downlink data may be based on the scheduling and/or control information (e.g., downlink data may be received at an instance indicated in the scheduling and/or control information).

Figure 8:
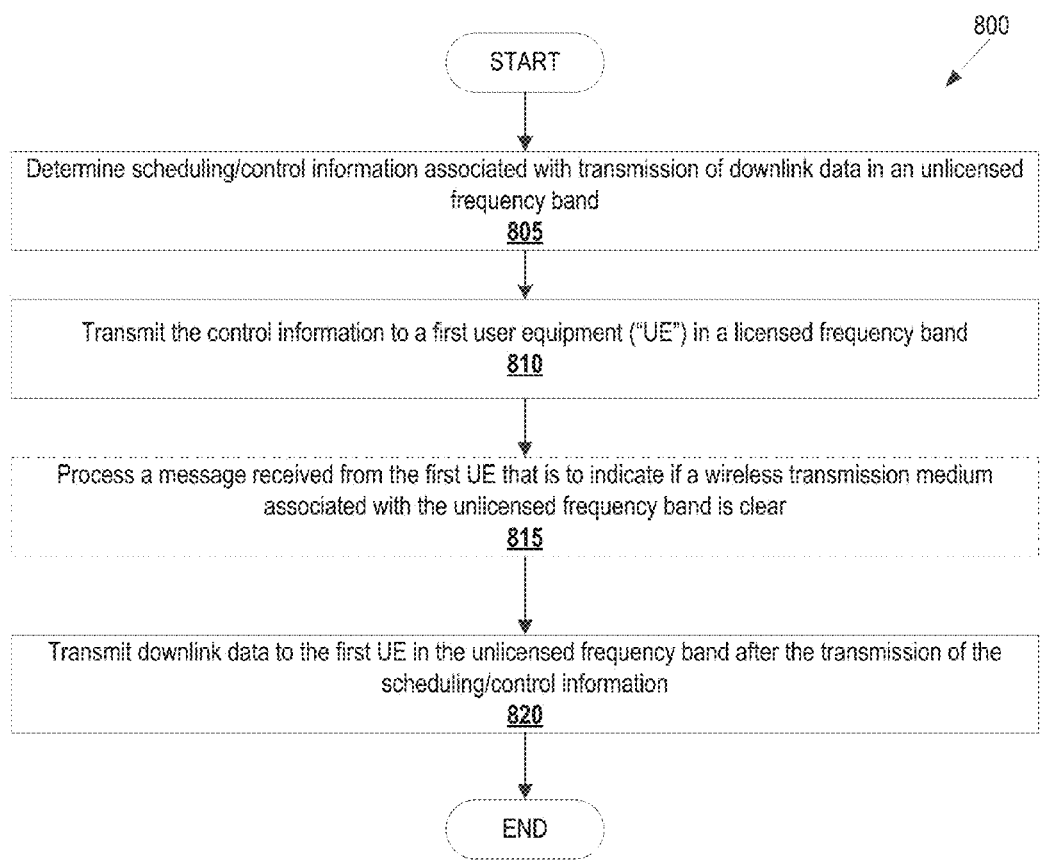
FIG. 8 is a flow diagram illustrating a method for cross-carrier, cross-subframe scheduling for transmitting downlink data in an unlicensed frequency band, in accordance with various embodiments.

In reference to FIG. 8, a flow diagram illustrates a method 800 for cross-carrier, cross-subframe scheduling for transmitting downlink data in an unlicensed frequency band, in accordance with various embodiments. The method 800 may be performed by an eNB, such as the eNB 105 of FIG. 1. While FIG. 8 illustrates a plurality of sequential operations, one of ordinary skill would understand that one or more operations of the method 800 may be transposed and/or performed contemporaneously.

To begin, the method 800 may include operation 805 for determining cross-carrier, cross-subframe scheduling information. This cross-carrier, cross-subframe scheduling information may indicate scheduling and/or control information for a downlink transmission that is to occur in an unlicensed frequency band. In various embodiments, this scheduling and/or control information may comprise an indication to transmit a request to reserve a wireless transmission medium associated with the unlicensed frequency band. In various embodiments, this scheduling and/or control information may comprise an indication of an instance (e.g., a time) at which downlink data is to be transmitted in the unlicensed frequency band.

Operation 810 may include transmitting the scheduling and/or control information to a first UE in the licensed frequency band. Therefore, the method 800 may include an operation 820 for transmitting the downlink data to the first UE in the unlicensed frequency band after transmission of the scheduling and/or control information.

In some embodiments, the method 800 may include operation 815 for processing a message received from the first UE that is to indicate if a wireless transmission medium associated with the unlicensed frequency band is clear. In various embodiments, the message may comprise information associated with performance of sensing of the medium by the first UE (e.g., feedback associated with performance of CCA). Operation 815 may include operations associated with determining whether the medium associated with the unlicensed frequency band is clear for the transmission of downlink data to the first UE and/or assuming that the first UE will transmit a message to reserve the medium in advance of the transmission of downlink data to the first UE. In one embodiment, the message may comprise an indication that the first UE has sent or is to send a message to reserve the medium (e.g., a CTS message).

In various embodiments, operation 820 may be based on operation 815. For example, operation 820 may be delayed until a message is processed at operation 815 that indicates the wireless transmission medium associated with the unlicensed frequency band is clear.

Figure 9:
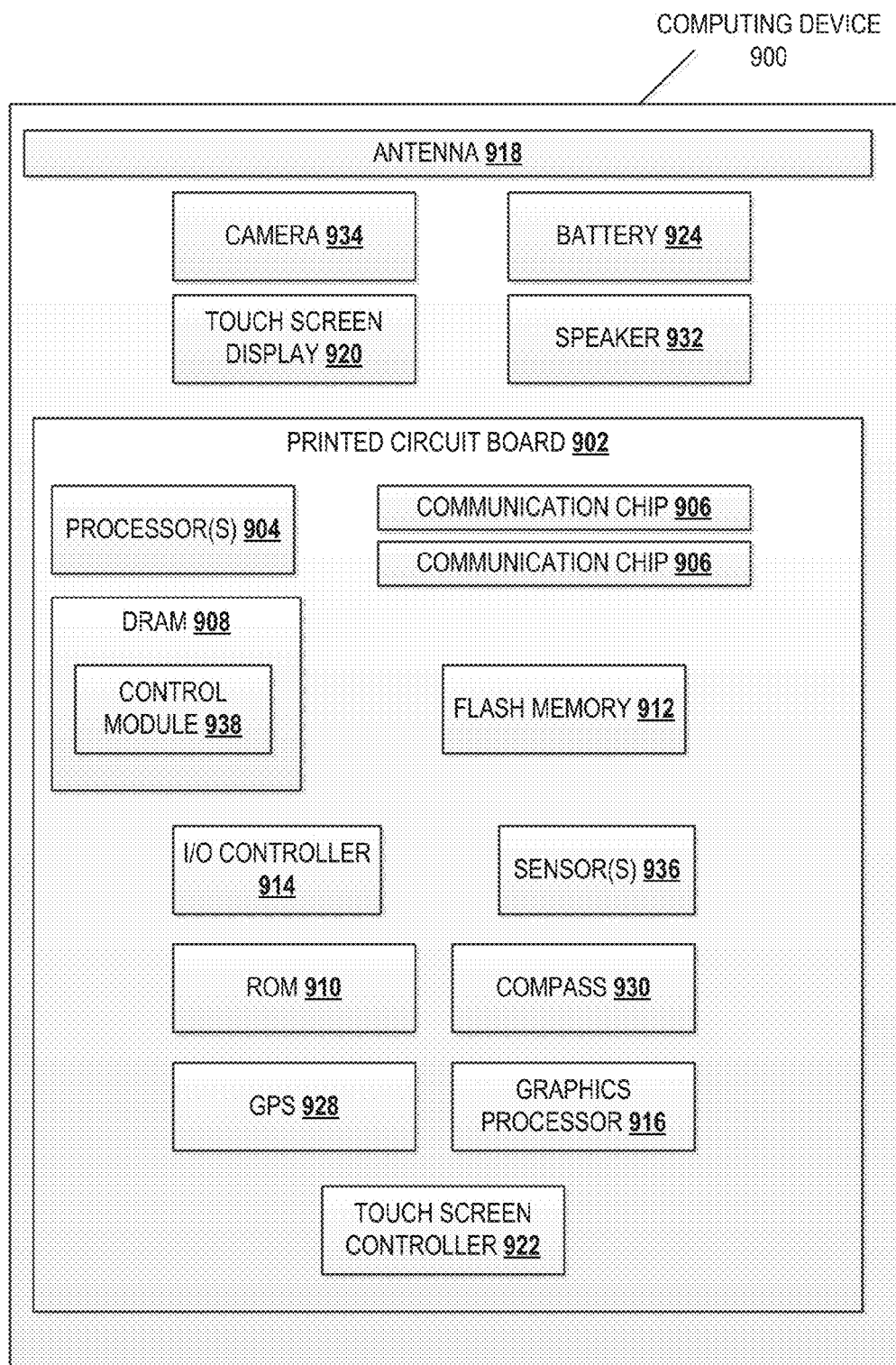
FIG. 9 is a block diagram illustrating a computing device adapted to operate in a wireless communication network, in accordance with various embodiments.

Now with reference to FIG. 9, a block diagram illustrates an example computing device 900, in accordance with various embodiments. The eNB 105 and/or one of the UEs 130, 135 of FIG. 1 and described herein may be implemented on a computing device such as computing device 900. Further, the computing device 900 may be adapted to perform one or more operations of the method 700 described with respect to FIG. 7 and/or the method 800 described with respect to FIG. 8. The computing device 900 may include a number of components, one or more processors 904, and one or more communication chips 906. Depending upon the embodiment, one or more of the enumerated components may comprise "circuitry" of the computing device 900, such as processing circuitry, communication circuitry, and the like. In various embodiments, the one or more processor(s) 904 each may be a processor core. In various embodiments, the one or more communication chips 906 may be physically and electrically coupled with the one or more processor(s) 904. In further implementations, the communication chips 906 may be part of the one or more processor(s) 904. In various embodiments, the computing device 900 may include a printed circuit board ("PCB") 902. For these embodiments, the one or more processor(s) 904 and communication chip 906 may be disposed thereon. In alternate embodiments, the various components may be coupled without the employment of the PCB 902.

Depending upon its applications, the computing device 900 may include other components that may or may not be physically and electrically coupled with the PCB 902. These other components include, but are not limited to, volatile memory (e.g., dynamic random access memory 908, also referred to as "DRAM"), non-volatile memory (e.g., read only memory 910, also referred to as "ROM"), flash memory 912, an input/output controller 914, a digital signal processor (not shown), a crypto processor (not shown), a graphics processor 916, one or more antenna(s) 918, a display (not shown), a touch screen display 920, a touch screen controller 922, a battery 924, an audio codec (not shown), a video code (not shown), a global navigation satellite system 928, a compass 930, an accelerometer (not shown), a gyroscope (not shown), a speaker 932, a camera 934, one or more sensors 936 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 904 may be integrated on the same die with other components to form a system on a chip ("SOC").

In various embodiments, volatile memory (e.g., DRAM 908), non-volatile memory (e.g., ROM 910), flash memory 912, and the mass storage device (not shown) may include programming instructions configured to enable the computing device 900, in response to the execution by one or more processor(s) 904, to practice all or selected aspects of the data exchanges and methods described herein, depending on the embodiment of the computing device 900 used to implement such data exchanges and methods. More specifically, one or more of the memory components (e.g., DRAM 908, ROM 910, flash memory 912, and the mass storage device) may include temporal and/or persistent copies of instructions that, when executed by one or more processor(s) 904, enable the computing device 900 to operate one or more modules (e.g., control module 938) configured to practice all or selected aspects of the data exchanges and method described herein, depending on the embodiment of the computing device 900 used to implement such data exchanges and methods.

The communication chips 906 may enable wired and/or wireless communication for the transfer of data to and from the computing device 900. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 906 may implement any of a number of wireless standards or protocols, including but not limited to LTE, LTE-A, Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 900 may include a plurality of communication chips 906 adapted to perform different communication functions. For example, a first communication chip 906 may be dedicated to shorter range wireless communications, such as Wi-Fi and Bluetooth, whereas a second communication chip 906 may be dedicated to longer range wireless communications, such as GPS, EDGE, GPRS, CDMA, WiMAX, LTE, LTE-A, Ev-DO, and the like.

Figure 10:
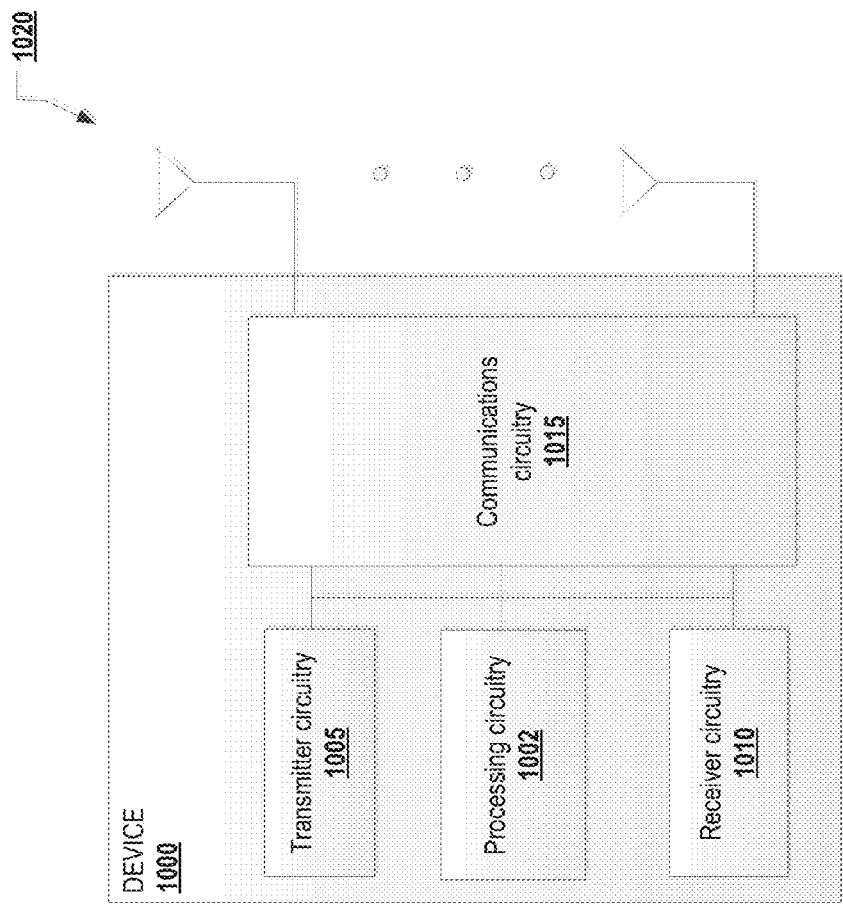
FIG. 10 is a block diagram illustrating a transmitting device, in accordance with various embodiments.

FIG. 10 illustrates a device 1000 in accordance with some embodiments. The device 1000 may be similar to and/or included in one of the eNBs 105, 130 and/or the UE 130 of FIG. 1. The device 1000 may include processing circuitry 1002, transmitter circuitry 1005, receiver circuitry 1010, communications circuitry 1015, and one or more antennas 1020 coupled with each other at least as shown.

Briefly, the communications circuitry 1015 may be coupled with the antennas 1020 to facilitate over-the-air communication of signals to/from the device 1000. Operations of the communications circuitry 1015 may include, but are not limited to, filtering, amplifying, storing, modulating, demodulating, transforming, etc. In various embodiments, the communications circuitry 1015 may comprise a plurality of different circuitries (e.g., radios). A first one of these communications circuitries may be adapted for communication in a first frequency band (e.g., an LTE-compatible frequency band). Another one of these communications circuitries may be adapted for communication in another frequency band (e.g., an unlicensed frequency band). In some embodiments, the processing circuitry 1002 may control in which frequency band data is to be transmitted and/or received.

The transmitter circuitry 1005 may be coupled with the communications circuitry 1015 and may be configured to provide signals to the communications circuitry 1015 for transmission by the antennas 1020. In various embodiments, the transmitter circuitry 1005 may be configured to provide various signal processing operations on the signal to provide the signal to the communications circuitry 1015 with appropriate characteristics. In some embodiments, the transmitter circuitry 1005 may be adapted to generate signals. Further, the transmitter circuitry 1005 may be adapted to scramble, multiplex, and/or modulate various signals prior to transmission by the communications circuitry 1015.

The receiver circuitry 1010 may be coupled with the communications circuitry 1015 and may be configured to receive signals from the communications circuitry 1015. In some embodiments, the receiver circuitry 1010 may be adapted to generate signals. Further, the receiver circuitry 1010 may be adapted to descramble, de-multiplex, and/or demodulate various signals following reception by the communications circuitry 1015.

The processing circuitry 1002 may be coupled with the transmitter circuitry 1005, the receiver circuitry 1010, and/or the communications circuitry 1015. The processing circuitry may be adapted to perform operations described herein with respect to an eNB and/or a UE. In some embodiments, the processing circuitry 1002 may be adapted to generate, process, and/or manipulate data that is to be transmitted over the air, e.g., to and/or from an eNB and/or a UE.

Some or all of the communications circuitry 1015, transmitter circuitry 1005, and/or receiver circuitry 1010 may be included in, for example, a communication chip and/or communicatively coupled with a printed circuit board as described with respect to FIG. 9.

In various embodiments, example 1 may include user equipment ("UE") circuitry comprising: receiver circuitry to receive, from an evolved Node B ("eNB") in a first frequency band, scheduling information associated with downlink transmission from the eNB; processing circuitry, coupled with the receiver circuitry, to perform clear channel assessment ("CCA") to determine if a wireless transmission medium associated with a second frequency band is clear and to generate a clear-to-send ("CTS") message based on the performed CCA and the received scheduling information; and transmitter circuitry, coupled with the receiver circuitry, to transmit the generated CTS message in the second frequency band to reserve the wireless transmission medium associated with the second frequency band. Example 2 may include the UE circuitry of example 1, wherein the first frequency band is associated with Long Term Evolution ("LTE") and the second frequency band is unlicensed. Example 3 may include the UE circuitry of example 1, wherein the transmitter circuitry is to broadcast the generated CTS message in a wireless local area network ("WLAN") to one or more WLAN transmitters. Example 4 may include the UE circuitry of example 1, wherein the receiver circuitry is to receive downlink data from the eNB in the second frequency band based on the scheduling information. Example 5 may include the UE circuitry of any of examples 1-4, wherein the processing circuitry is to generate an acknowledgement message that indicates that the wireless transmission medium associated with the second frequency band is clear before the transmitter circuitry transmits the generated CTS message, and further wherein the transmitter circuitry is to transmit the acknowledgement message to the eNB in the first frequency band. Example 6 may include the UE circuitry of any of examples 1-4, wherein the processing circuitry is to generate an acknowledgement message that includes at least one value from the performance of the CCA, and further wherein the transmitter circuitry is to transmit the acknowledgement message to the eNB in the first frequency band. Example 7 may include the UE circuitry of example 6, wherein the processing circuitry is to cause the transmitter circuitry to transmit the acknowledgement message before the transmission of the CTS message. Example 8 may include the UE circuitry of any of examples 1-4, wherein the processing circuitry is to generate the CTS message to include a receiver address value and a duration value. Example 9 may include the UE circuitry of any of examples 1-4, wherein at least one of the receiver address value and the duration value is based on the scheduling information received from the eNB. Example 10 may include the UE circuitry of any of examples 1-4, wherein the processing circuitry is to cause the transmitter circuitry to transmit the CTS message at a time indicated by the scheduling information.

In various embodiments, example 11 may include evolved Node B ("eNB") circuitry comprising: processing circuitry to generate a message that includes scheduling information for reservation of a wireless transmission medium associated with an unlicensed frequency band and to determine downlink data to be transmitted to a user equipment ("UE") in the unlicensed frequency band; and transmitter circuitry, coupled with the processing circuitry, to transmit the message to the UE in a licensed frequency band and to transmit the downlink data to the UE in the unlicensed frequency band after the transmission of the scheduling information. Example 12 may include the eNB circuitry of example 11, wherein the licensed frequency band is associated with Long Term Evolution ("LTE"). Example 13 may include the eNB circuitry of example 11, wherein the processing circuitry is to cause the transmitter circuitry to transmit the downlink data to the UE without indication that the wireless transmission medium associated with the unlicensed frequency band is clear. Example 14 may include the eNB circuitry of example 11, further comprising: receiver circuitry, coupled with the processing circuitry, to receive an acknowledgement message in the licensed frequency band that is to indicate whether that the wireless transmission medium associated with the unlicensed frequency band is clear, wherein the processing circuitry is to cause the transmitter circuitry to transmit the downlink data to the UE based on the acknowledgement message. Example 15 may include the eNB of example 14, wherein the acknowledgement message includes at least one value from a clear channel assessment ("CCA"). Example 16 may include the eNB of example 14, wherein the acknowledgement message is received from a different UE than the UE to which the downlink data is transmitted. Example 17 may include the eNB of any of examples 11-16, wherein the processing circuitry is to include an indication of at least one of a receiver address or a duration which the wireless transmission medium associated with the unlicensed frequency band is to be reserved. Example 18 may include the eNB of any of examples 11-16, wherein the processing circuitry is to include in the scheduling information an indication of a time at which the UE is to transmit a request to reserve the wireless transmission medium associated with the unlicensed frequency band. Example 19 may include the eNB of any of examples 11-16, wherein the transmitter circuitry is to transmit the scheduling information to a plurality of UEs, and further wherein the processing circuitry is to include an indication of whether the plurality of UEs are to transmit respective requests to reserve the wireless transmission medium sequentially or simultaneously.

Example 20 may include one or more non-transitory computer-readable media comprising computing device-executable instructions, wherein the instructions, in response to execution by a user equipment ("UE"), cause the UE to: process scheduling information to be received from an evolved Node B ("eNB") in a licensed frequency band; perform medium sensing to determine if a wireless transmission medium associated with an unlicensed frequency band is clear; and generate a request to reserve the wireless transmission medium based on the scheduling information; and transmit the request in the unlicensed frequency band to reserve the wireless transmission medium based on the performance of the medium sensing. Example 21 may include the one or more non-transitory computer-readable media of example 20, wherein the instructions further cause the UE to: generate a message based on the performance of the medium sensing; and transmit the feedback message to the eNB. Example 22 may include the one or more non-transitory computer-readable media of example 21, wherein the instructions cause the message to be generated before the transmission of the request message. Example 23 may include the one or more non-transitory computer-readable media of example 21, wherein the instructions cause the message to be transmitted before the transmission of the request.

Example 24 may include one or more non-transitory computer-readable media comprising computing device-executable instructions, wherein the instructions, in response to execution by an evolved Node B ("eNB"), cause the eNB to: determine scheduling information associated with transmission of downlink data in a wireless transmission medium associated with an unlicensed frequency band; transmit the scheduling information to a first user equipment ("UE") in a licensed frequency band; and transmit downlink data to a second UE in the unlicensed frequency band after the transmission of the scheduling information. Example 25 may include the one or more non-transitory computer-readable media of example 24, wherein the transmission of the downlink data is based on an assumption that the wireless transmission medium has been reserved and not based on a message from the first or second UEs indicating that the wireless transmission medium has been reserved.

Example 26 may include a method to be performed by a user equipment ("UE"), the method comprising: receiving, from an evolved Node B ("eNB") in a first frequency band, scheduling information associated with downlink transmission from the eNB; performing clear channel assessment ("CCA") to determine if a wireless transmission medium associated with a second frequency band is clear; generating a clear-to-send ("CTS") message based on the CCA and the received scheduling information; and transmitting the generated CTS message in the second frequency band to reserve the wireless transmission medium associated with the second frequency band. Example 27 may include the method of example 26, further comprising: receiving downlink data from the eNB in the second frequency band based on the scheduling information. Example 28 may include the method of any of examples 26-27, further comprising: generating an acknowledgement message that indicates that the wireless transmission medium associated with the second frequency band is clear before the transmitting of the generated CTS message; and transmitting the acknowledgement message to the eNB in the first frequency band. Example 29 may include the method of any of examples 26-27, further comprising: generating a message that includes at least one value from the CCA; and transmitting the message to the eNB in the first frequency band before transmitting the CTS message in the second frequency band.

Example 30 may include an apparatus to be included in a user equipment ("UE"), the apparatus comprising: means for receiving, from an evolved Node B ("eNB") in a first frequency band, scheduling information associated with downlink transmission from the eNB; means for performing clear channel assessment ("CCA") to determine if a wireless transmission medium associated with a second frequency band is clear; means for generating a clear-to-send ("CTS")

message based on the CCA and the received scheduling information; and means for transmitting the generated CTS message in the second frequency band to reserve the wireless transmission medium associated with the second frequency band. Example 31 may include the apparatus of example 30, further comprising: means for receiving downlink data from the eNB in the second frequency band based on the scheduling information. Example 32 may include the apparatus of any of examples 30-31, further comprising: means for generating an acknowledgement message that indicates that the wireless transmission medium associated with the second frequency band is clear before the transmitting of the generated CTS message; and means for transmitting the acknowledgement message to the eNB in the first frequency band. Example 33 may include the apparatus of any of examples 30-31, further comprising: means for generating a message that includes at least one value from the CCA; and means for transmitting the message to the eNB in the first frequency band before transmitting the CTS message in the second frequency band.

Example 34 may include a method to be performed by an evolved Node B ("eNB"), the method comprising: generating a message that includes scheduling information for reservation of a wireless transmission medium associated with an unlicensed frequency band; determining downlink data to be transmitted to a user equipment ("UE") in the unlicensed frequency band; transmitting the message to the UE in a licensed frequency band; and transmitting the downlink data to the UE in the unlicensed frequency band after the transmitting of the scheduling information. Example 35 may include the method of example 34, wherein the transmitting of the downlink data to the UE in the unlicensed frequency band is not based on an indication, received from the UE, that the wireless transmission medium associated with the unlicensed frequency band is clear. Example 36 may include the method of example 34, further comprising: receiving an acknowledgement message in the licensed frequency band that is to indicate whether that the wireless transmission medium associated with the unlicensed frequency band is clear, wherein the transmitting of the downlink data to the UE is based on the acknowledgement message. Example 37 may include the method of example 36, wherein the acknowledgement message includes at least one value from a clear channel assessment ("CCA").

Example 38 may include an apparatus to be included in an evolved Node B ("eNB"), the apparatus comprising: means for generating a message that includes scheduling information for reservation of a wireless transmission medium associated with an unlicensed frequency band; means for determining downlink data to be transmitted to a user equipment ("UE") in the unlicensed frequency band; means for transmitting the message to the UE in a licensed frequency band; and means for transmitting the downlink data to the UE in the unlicensed frequency band after the transmitting of the scheduling information. Example 39 may include the apparatus of example 38, wherein the means for transmitting of the downlink data to the UE in the unlicensed frequency band is not to base the transmitting of the downlink data on an indication, received from the UE, that the wireless transmission medium associated with the unlicensed frequency band is clear. Example 40 may include the apparatus of example 38, further comprising: means for receiving an acknowledgement message in the licensed frequency band that is to indicate whether that the wireless transmission medium associated with the unlicensed frequency band is clear, wherein means for the transmitting of the downlink data to the UE is to base the transmitting of the downlink data on the acknowledgement message.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine-(e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A user equipment ("UE") circuitry comprising:
  receiver circuitry to receive, from an evolved Node B ("eNB") in a physical downlink control channel ("PDCCH") or an enhanced PDCCH ("EPDCCH") of a first frequency band, scheduling and control information associated with downlink transmission from the eNB, the control information to specify an amount of time that the UE circuitry is to reserve a wireless transmission medium associated with a second frequency band;
processing circuitry, coupled with the receiver circuitry, to perform clear channel assessment ("CCA") to determine if the wireless transmission medium is clear and to generate a clear-to-send ("CTS") message based on the performed CCA and the received scheduling information; and
transmitter circuitry, coupled with the receiver circuitry, to transmit the generated CTS message in the second frequency band to reserve the wireless transmission medium associated with the second frequency band for the specified amount of time.

2. The UE circuitry of claim 1, wherein the first frequency band is associated with Long Term Evolution ("LTE") and the second frequency band is unlicensed.

3. The UE circuitry of claim 1, wherein the transmitter circuitry is to broadcast the generated CTS message in a wireless local area network ("WLAN") to one or more WLAN transmitters.

4. The UE circuitry of claim 1, wherein the receiver circuitry is to receive downlink data from the eNB in the second frequency band based on the scheduling information.

5. The UE circuitry of claim 1, wherein the processing circuitry is to generate an acknowledgement message that indicates that the wireless transmission medium associated with the second frequency band is clear before the transmitter circuitry transmits the generated CTS message, and further wherein the transmitter circuitry is to transmit the acknowledgement message to the eNB in the first frequency band.

6. The UE circuitry of claim 1, wherein the processing circuitry is to generate an acknowledgement message that includes at least one value from the performance of the CCA, and further wherein the transmitter circuitry is to transmit the acknowledgement message to the eNB in the first frequency band.

7. The UE circuitry of claim 6, wherein the processing circuitry is to cause the transmitter circuitry to transmit the acknowledgement message before the transmission of the CTS message.

8. The UE circuitry of claim 1, wherein the processing circuitry is to generate the CTS message to include a receiver address value and a duration value.

9. The UE circuitry of claim 1, wherein at least one of the receiver address value and the duration value is based on the scheduling information received from the eNB.

10. The UE circuitry of claim 1, wherein the processing circuitry is to cause the transmitter circuitry to transmit the CTS message at a time indicated by the scheduling information.

11. An evolved Node B ("eNB") circuitry comprising:
processing circuitry to generate a message that includes scheduling information for reservation of a wireless transmission medium associated with an unlicensed frequency band and to determine downlink data to be transmitted to a user equipment ("UE") in the unlicensed frequency band; and
transmitter circuitry, coupled with the processing circuitry, to transmit the message to the UE in a physical downlink control channel ("PDCCH") or an enhanced PDCCH ("EPDCCH") of a licensed frequency band and to transmit the downlink data to the UE in the unlicensed frequency band after the transmission of the scheduling information,
wherein the transmitter circuitry is to transmit the scheduling information to a plurality of UEs, and the processing circuitry is to include an indication that the plurality of UEs are to transmit respective clear-to-send ("CTS") messages to reserve the wireless transmission medium simultaneously after performing clear channel assessment ("CCA") to determine if the wireless transmission medium associated with the unlicensed frequency band is clear.

12. The eNB circuitry of claim 11, wherein the licensed frequency band is associated with Long Term Evolution ("LTE").

13. The eNB circuitry of claim 11, wherein the processing circuitry is to cause the transmitter circuitry to transmit the downlink data to the UE without indication that the wireless transmission medium associated with the unlicensed frequency band is clear.

14. The eNB circuitry of claim 11, further comprising:
receiver circuitry, coupled with the processing circuitry, to receive an acknowledgement message in the licensed frequency band that is to indicate whether the wireless transmission medium associated with the unlicensed frequency band is clear,
wherein the processing circuitry is to cause the transmitter circuitry to transmit the downlink data to the UE based on the acknowledgement message.

15. The eNB of claim 14, wherein the acknowledgement message includes at least one value from a clear channel assessment ("CCA").

16. The eNB of claim 14, wherein the acknowledgement message is received from a different UE than the UE to which the downlink data is transmitted.

17. The eNB of claim 11, wherein the processing circuitry is to include an indication of at least one of a receiver address or a duration which the wireless transmission medium associated with the unlicensed frequency band is to be reserved.

18. The eNB of claim 11, wherein the processing circuitry is to include in the scheduling information an indication of a time at which the UE is to transmit a request to reserve the wireless transmission medium associated with the unlicensed frequency band.

19. One or more non-transitory computer-readable media comprising computing device-executable instructions, wherein the instructions, in response to execution by a user equipment ("UE"), cause the UE to:
process scheduling and control information received from an evolved Node B ("eNB") in a physical downlink control channel ("PDCCH") or an enhanced PDCCH ("EPDCCH") of a licensed frequency band, the control information to specify an amount of time that the UE is to reserve a wireless transmission medium associated with an unlicensed frequency band;
perform clear channel assessment ("CCA") to determine if the wireless transmission medium associated with the unlicensed frequency band is clear; and
generate a clear-to-send ("CTS") message based on the performed CCA and the received scheduling information to reserve the wireless transmission medium based on the scheduling and control information; and
transmit the CTS message in the unlicensed frequency band to reserve the wireless transmission medium based on performance of medium sensing.

20. The one or more non-transitory computer-readable media of claim 19, wherein the instructions cause the CTS message to be generated before the transmission of a request.

21. The one or more non-transitory computer-readable media of claim 19, wherein the instructions cause the CTS message to be transmitted before the transmission of a request.

22. One or more non-transitory computer-readable media comprising computing device-executable instructions, wherein the instructions, in response to execution by an evolved Node B ("eNB"), cause the eNB to:

determine scheduling information associated with transmission of downlink data in a wireless transmission medium associated with an unlicensed frequency band;

transmit the scheduling information and control information to a first user equipment ("UE") in a physical downlink control channel ("PDCCH") or an enhanced PDCCH ("EPDCCH") of a licensed frequency band, the control information to specify an amount of time that the first UE is to reserve the wireless transmission medium; and transmit downlink data to a second UE in the unlicensed frequency band after the transmission of the scheduling information, wherein the scheduling information is transmitted to a plurality of UEs, and the scheduling information includes an indication that the plurality of UEs are to transmit respective clear-to-send ("CTS") messages to reserve the wireless transmission medium simultaneously after performing clear channel assessment ("CCA") to determine if the wireless transmission medium associated with the unlicensed frequency band is clear.

23. The one or more non-transitory computer-readable media of claim 22, wherein the transmission of the downlink data is based on an assumption that the wireless transmission medium has been reserved and not based on a message from the first or second UEs indicating that the wireless transmission medium has been reserved.

* * * * *